US010735460B2

(12) United States Patent
Mehta

(10) Patent No.: US 10,735,460 B2
(45) Date of Patent: *Aug. 4, 2020

(54) TELEPHONE SERVICE DELAY AND CONNECTION SYSTEM

(71) Applicant: CALLFIRE, INC., Santa Monica, CA (US)

(72) Inventor: Vijesh Mehta, Los Angeles, CA (US)

(73) Assignee: CALLFIRE, INC., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/397,927

(22) Filed: Apr. 29, 2019

(65) Prior Publication Data

US 2019/0260798 A1 Aug. 22, 2019

Related U.S. Application Data

(63) Continuation of application No. 15/974,600, filed on May 8, 2018, now Pat. No. 10,277,627.

(60) Provisional application No. 62/542,991, filed on Aug. 9, 2017.

(51) Int. Cl.
| H04L 29/06 | (2006.01) |
| H04L 12/66 | (2006.01) |
| H04M 3/436 | (2006.01) |
| H04W 48/06 | (2009.01) |
| H04W 28/02 | (2009.01) |
| H04W 12/12 | (2009.01) |
| H04M 3/36 | (2006.01) |
| H04M 3/42 | (2006.01) |

(52) U.S. Cl.
CPC ........ *H04L 63/1458* (2013.01); *H04M 3/367* (2013.01); *H04M 3/436* (2013.01); *H04W 12/12* (2013.01); *H04W 28/0289* (2013.01); *H04W 48/06* (2013.01); *H04M 3/42314* (2013.01); *H04M 2201/14* (2013.01)

(58) Field of Classification Search
CPC ... H04L 63/1458; H04M 3/436; H04W 12/12; H04W 28/0289; H04W 48/06
See application file for complete search history.

(56) References Cited

U.S. PATENT DOCUMENTS

| 6,466,651 B1 | 10/2002 | Dailey |
| 8,180,032 B2 | 5/2012 | Yasrebi et al. |
| 8,391,144 B1 * | 3/2013 | Pannell ................... H04L 47/10 370/230 |
| 2005/0163126 A1 | 7/2005 | Bugenhagen et al. |
| 2007/0217391 A1 | 9/2007 | Hildebrand et al. |

(Continued)

*Primary Examiner* — Mohammad A Siddiqi
(74) *Attorney, Agent, or Firm* — Knobbe, Martens, Olson & Bear, LLP

(57) ABSTRACT

A denial of service (DoS) detection and circumvention system is described herein. The DoS detection and circumvention system can track phone calls that are initiated and store a list of phone numbers that are called. The DoS detection and circumvention system can also track the number of carrier congestion messages over a certain time window. Using the list of called phone numbers and the tracked number of carrier congestion messages, the DoS detection and circumvention system can identify excessive congestion. If the DoS detection and circumvention system identifies excessive congestion, the DoS detection and circumvention system can delay calls so as to prevent a possible DoS condition.

16 Claims, 5 Drawing Sheets

(56) References Cited

U.S. PATENT DOCUMENTS

| | | |
|---|---|---|
| 2009/0293123 A1 | 11/2009 | Jackson et al. |
| 2011/0023086 A1 | 1/2011 | Goldman et al. |
| 2011/0080828 A1 | 4/2011 | North et al. |
| 2011/0267942 A1* | 11/2011 | Aybay ............... H04L 41/0816 370/230 |
| 2016/0044529 A1 | 2/2016 | Pinheiro et al. |
| 2016/0050159 A1 | 2/2016 | Cook et al. |
| 2016/0127539 A1 | 5/2016 | Sharma |
| 2017/0353226 A1* | 12/2017 | HomChaudhuri ... H04B 17/318 |

* cited by examiner

TELEPHONE SERVICE DELAY AND CONNECTION SYSTEM

CROSS-REFERENCE TO RELATED APPLICATION

The present application is a continuation of U.S. patent application Ser. No. 15/974,600, filed on May 8, 2018, which claims priority to U.S. Provisional Patent Application No. 62/542,991, filed on Aug. 9, 2017, the contents of both of which are incorporated by reference herein.

BACKGROUND

Electronic devices may be used to exchange information over communication networks. For example, a mobile or landline phone may be used to initiate a voice call with another mobile or landline phone. The phone may initiate the voice call with the other phone over the public switched telephone network (PSTN). A user of the other phone can receive an indication that a voice call is received and accept the voice call, if desired. Some mobile phones are configured to send and/or receive text messages, images, video, and other media information in addition to voice calls. For example, some mobile phones may generate and transmit multimedia messaging service (MMS) messages to other mobile devices.

Some mobile or landline devices, traditional computing devices (e.g., desktop or notebook computers), or other electronic devices may be capable of executing application software and accessing a packet switched data network, such as a local area network (LAN) or the Internet. Such devices may be referred to as "smart devices," and include smart phones, tablets, and the like. Smart devices may use voice over Internet protocol (VoIP), instant messaging, chat, or other application software to generate voice calls and/or messages and send them to other devices over data networks. The recipients may be other smart devices, traditional computing devices (e.g., desktop or notebook computers), or other electronic devices.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION OF ILLUSTRATIVE EMBODIMENTS

Introduction

Figure 1:
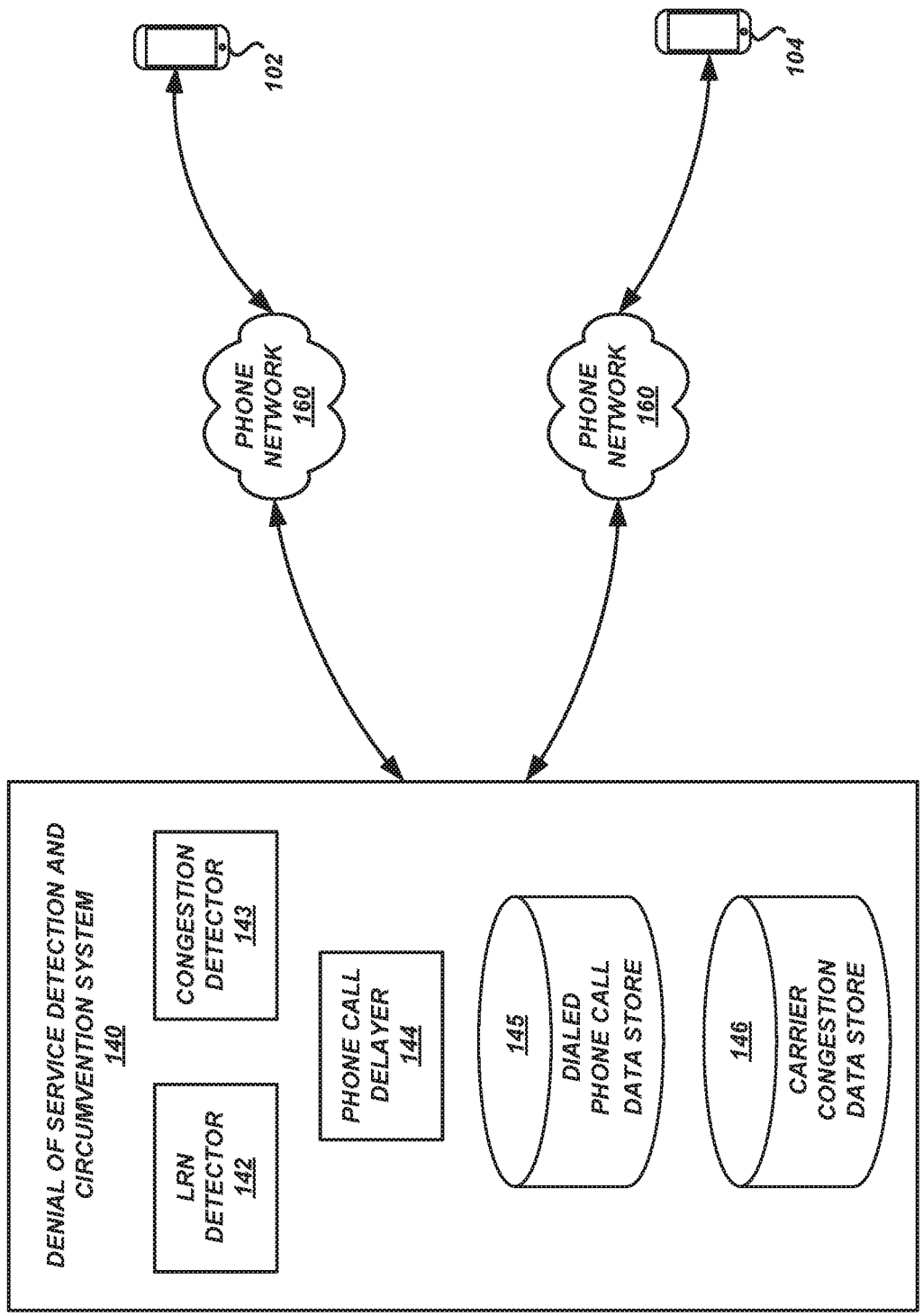
FIG. 1 illustrates a DoS detection and circumvention environment in which aspects of the present disclosure may be implemented according to some embodiments.

The present disclosure is directed to a denial of service (DoS) detection and circumvention system that detects potential DoS attacks (or similar conditions) during phone call routing and implements circumvention measures. For example, a DoS attack may occur when a malicious user or system attempts to dial one or more phone numbers that have the same numbering plan area code (NPA) and central office exchange code (NXX) repeatedly over a short period of time so as to prevent desired users from reaching such phone numbers or the owner of such phone numbers from making outgoing calls. As an illustrative example, phone numbers with the same NPA and NXX codes may be in the form NPA-NXX-XXXX, where "NPA" represents a particular NPA code, "NXX" represents a particular central office exchange code, and "XXXX" represents a multi-digit number in which any of the digits may be the same or different than any or all of the other digits in the multi-digit number. A malicious user or system may attempt to dial one or more of the NPA-NXX-XXXX phone numbers hundreds to thousands of times each within a minute. Calling one or more of the NPA-NXX-XXXX phone numbers at this frequency may cause the phone numbers to be unusable by the respective owners and may prevent others from reaching the phone numbers. An artificial DoS attack (e.g., a condition in which the effects of a DoS attack occur without any malicious intent) may occur if many users or systems happen to dial one or more of the NPA-NXX-XXXX phone numbers within the same short time period.

As described above, when a phone call is initiated from one phone, the call is generally routed through a public switched telephone network (PSTN) to another phone. Accordingly, it may be beneficial to detect the occurrence of a denial of service attack during the routing of a phone call so that the effects of the DoS attack can be circumvented.

For example, the DoS detection and circumvention system described herein can be located within the PSTN (e.g., as part of a router or switch). The DoS detection and circumvention system can track phone calls that are initiated and store a list of phone numbers that are called, where the list is organized by NPA and NXX. The DoS detection and circumvention system can determine the NPA and/or NXX by analyzing the location routing number (LRN), which is a unique number in the format of a normal telephone number that represents the telephone switch through which multiple telephone numbers are routed. As an illustrative example, 213-555-XXXX may represent the LRN of a telephone switch that is used when one phone dials the telephone number 213-555-5555. The DoS detection and circumvention system can also or alternatively track the number of carrier congestion messages by NPA and/or NXX over a certain time window. Using the list of called phone numbers and/or the tracked number of carrier congestion messages, the DoS detection and circumvention system can identify excessive congestion in a particular NPA and/or NXX within a time window. If the DoS detection and circumvention system identifies excessive congestion, the DoS detection and circumvention system can delay calls to phone numbers that fall within the NPA and/or NXX so as to prevent a possible DoS attack from affecting the use of such phone numbers.

Although aspects of some embodiments described in the disclosure will focus, for the purpose of illustration, on particular examples of end user devices, networks, network conditions, and messaging protocols, the examples are illustrative only and are not intended to be limiting. In some embodiments, the techniques described herein may be applied to additional or alternative end user devices, networks, network conditions, and messaging protocols. For example, although many of the examples herein focus on detecting DoS attacks, the features of the present disclosure are not limited to only malicious or other intentional DoS attacks. In some cases, the features of the present disclosure may be used to detect and circumvent other network conditions that are caused by, or result in, network congestion and/or rejected phone calls. The network conditions may or may not be associated with intentional or artificial DoS attacks. Various aspects of the disclosure will now be described with regard to certain examples and embodiments, which are intended to illustrate but not limit the disclosure.

DoS Detection and Circumvention Environment

With reference to an illustrative embodiment, FIG. 1 illustrates a DoS detection and circumvention environment in which aspects of the present disclosure may be implemented. As illustrated in FIG. 1, the DoS detection and circumvention environment includes a denial of service (DoS) detection and circumvention system 140 that may be located within a PSTN. The DoS detection and circumvention environment may also include various communication devices 102, 104. The communication devices 102, 104 may also be collectively referred to as end-user devices, or more simply as user devices. The DoS detection and circumvention system 140 and the various user devices 102, 104 may communicate with each other via one or more communication networks 160.

In some embodiments, communication network 160 may be a circuit-switched network or other telephone network. For example, communication network 160 may be a publicly-accessible telephone network, such as the PSTN. In some cases, the communication network 160 may be or include a private telephone network, such as a private branch exchange (PBX). Communication network 160 may be referred to as a "phone network" to highlight its use as a network for transmitting telephone communications such as telephone call audio, text messages, and the like. In some embodiments, communication network 160 may also be used to transmit bit-encoded data, and/or it may include a packet-switched data network. For example, communication network 160 may be or include a publicly-accessible network of linked networks, possibly operated by various distinct parties, such as the Internet. In some cases, the communication network 160 may include a private network, personal area network, local area network, wide area network, cable network, satellite network, cellular data network, etc., or a combination thereof, some or all of which may or may not have access to and/or from the Internet. In this embodiment, the communication network 160 may be referred to as a "data network" to highlight its use as a network for transmitting bit-encoded data. For example, the network 160 may be used to connect VoiP phone calls and the DoS detection and circumvention system 140 may be used to manage such calls.

The DoS detection and circumvention system 140 may include various components for providing the features described herein. Illustratively, the DoS detection and circumvention system 140 may include an LRN detector 142, a congestion detector 143, a phone call delayer 144, a dialed phone call data store 145, and a carrier congestion data store 146.

For example, as phone numbers are dialed or submitted by a communication device 102 or 104, the LRN detector 142 may intercept or otherwise receive information, including a phone number from which the phone call originated (e.g., an originating phone number) and a phone number that was dialed (e.g., a destination phone number). The LRN detector 142 can then parse the destination phone number to identify the LRN. As an illustrative example, if the destination phone number is 213-321-5555, then the LRN detector 142 generally identifies 213-321 as the LRN of the destination phone number. However, in some embodiments, a user may port a phone number (e.g., when the user changes service providers or moves to a new geographic location, but wishes to keep the existing phone number). In such situations, the LRN of the destination phone number may be different than the first six digits of the respective phone number. Once the LRN is identified, the LRN detector 142 can further parse the LRN to identify the NPA and/or the NXX. In the example illustrated above, the LRN detector 142 identifies 213 as the NPA of the destination phone number, and 321 as the NXX of the destination phone number (if the destination phone number is not ported). Once the LRN detector 142 identifies the NPA and/or NXX, the LRN detector 142 can store the origination and/or destination phone numbers in the dialed phone call data store 145. For example, the LRN detector may store an entry associated with the NPA and/or NXX of the origination and/or destination phone numbers.

The congestion detector 143 can receive carrier congestion messages from a service provider. In some embodiments, congestion messages come from phone service providers or "carriers" (e.g., T-Mobile, AT&T etc.). Illustratively, when a phone initiates a call through a phone service provider, the phone service provider may provide a response message, such as a session initiation protocol code (also referred to as a SIP code). The response message may provide call status or other information regarding a call, such as information indicating the call has been successfully initiated, the destination phone is ringing, the line is busy, there is carrier congestion, and the like. These response messages and/or the lack of a response altogether can be used to indicate a problem sending a call. In one specific non-limiting example, the carrier congestion messages may indicate that a service provider has identified congestion in a particular NPA and/or NXX (e.g., a high volume of phone calls being routed to a given NPA and/or NXX such that the available number of circuits or bandwidth is not sufficient to allow all phone calls to be connected simultaneously). The congestion detector 143 can store these carrier congestion messages (or data derived therefrom) in the carrier congestion data store 146. The congestion detector 143 can analyze the carrier congestion messages to identify the number of carrier congestion messages that have been received for a particular NPA and/or NXX within a threshold time period. The congestion detector 143 can forward this information to the phone call delayer 144.

The phone call delayer 144 can retrieve the origination and/or destination phone numbers stored in the dialed phone call data store 145 and receive the information provided by the congestion detector 143 to identify whether phone calls to a particular NPA and/or NXX should be delayed and/or prevented from being sent to the NPA and/or NXX due to excessive congestion. For example, if the phone call delayer 144 determines that the number of carrier congestion messages that have been received for a particular NPA and/or NXX within a threshold time period exceeds a threshold number (e.g., 2000 congestion messages within 1 minute), then the phone call delayer 144 can prevent the communication network 160 from sending the phone call to the telephone switch corresponding to the LRN of the NPA and/or NXX experiencing the congestion. Alternatively, or in addition, the phone call delayer 144 can implement a delay before allowing a phone call to be sent to the telephone switch corresponding to the LRN of the NPA and/or NXX experiencing the congestion. For example, the phone call delayer 144 can prevent a phone call from being sent to the telephone switch for a threshold period of time after a time that a carrier congestion message was received that triggered the phone call delayer 144 to identify that excessive congestion was present. Once the threshold period of time expires (e.g., greater than about 1 second, greater than about 3 seconds, greater than about 5 seconds, greater than about 10 seconds, 1-2 seconds, 1-3 seconds, 1-5 seconds, etc.), the phone call delayer 144 may allow the phone call to be sent to the telephone switch (or retry the phone call, if previously sent to the telephone switch). The phone call delayer 144 can queue one or more phone calls during the threshold period of time and allow each phone call to be sent to the telephone switch in the order in which the phone calls were received once the threshold period of time expires. In some embodiments, the phone call delayer 114 may prioritize delayed calls such that calls determined to be more important or less likely to be malicious are retried before other calls, more often than other calls, etc.

Figure 2:
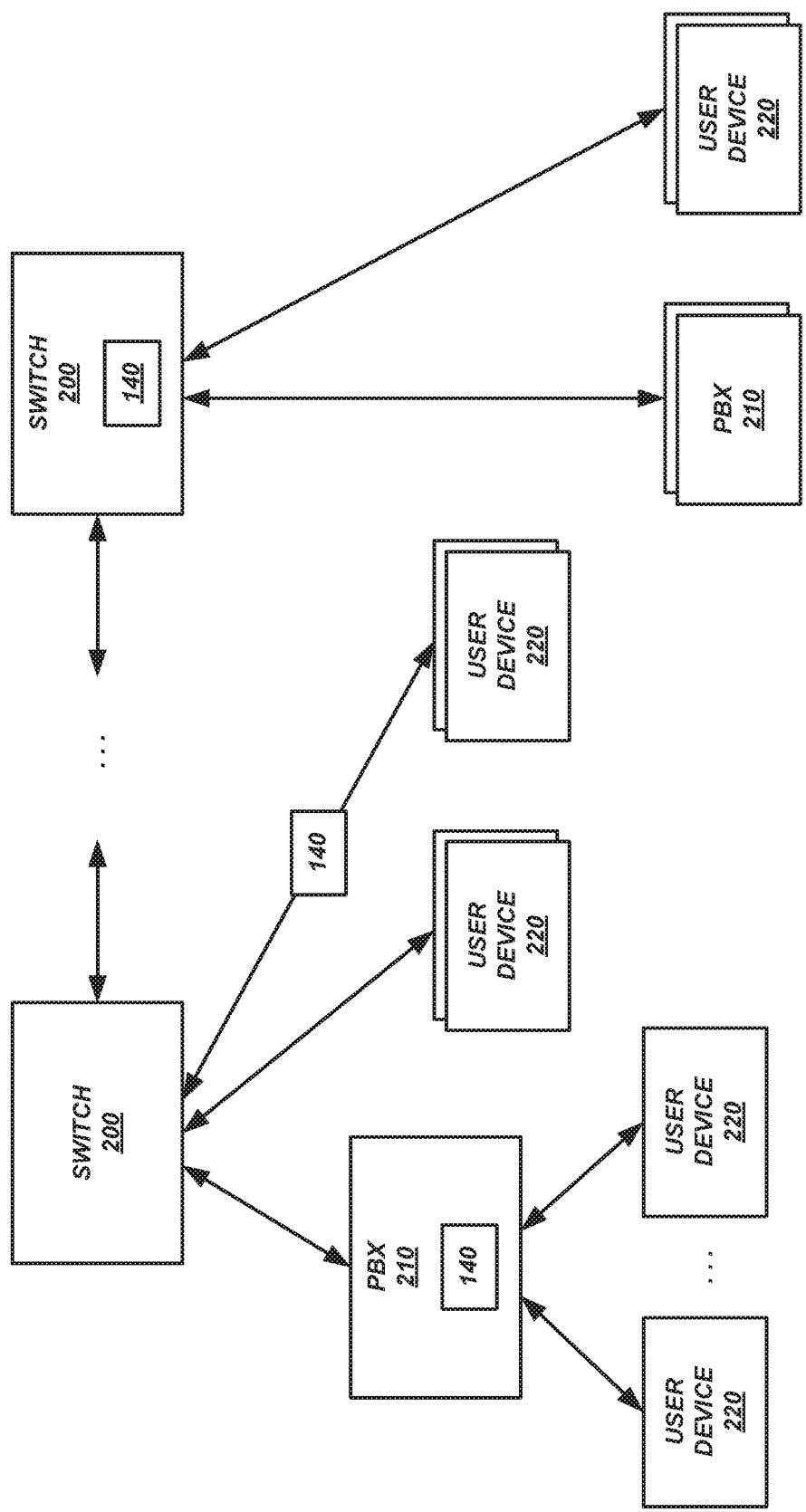
FIG. 2 illustrates an illustrative telecommunications network environment in which aspects of the present disclosure may be implemented according to some embodiments.

FIG. 2 shows an illustrative network environment (such as a PSTN) in which one or more DoS detection and circumvention systems 140 may be implemented. In some embodiments, as shown, the network environment may include one or more switches 200. Individual switches 200 may be connected to other switches, to PBXs 210, to end-user devices 220, etc. Illustratively, if a user of one user device 200 initiates a call to another user device 220, the phone call is routed through one or more of the switches 200 (and, if necessary, through one or more PBXs 210).

A DoS detection and circumvention system 140 may be implemented at various locations within the network environment to detect and help circumvent DoS attacks (or similar conditions). In some embodiments, as shown, a DoS detection and circumvention system 140 may be implemented as a component of (or in communication with) a PBX 210. For example, an organization (e.g., a company, university, etc.) may use a PBX 210 to provide phone service into and out of the organization. Illustratively, the organization may provide recorded voice communications (e.g., reminders, marketing, etc.) to user devices 220 outside of the organization. The organization may therefore make a large quantity of phone calls in a short period of time, or over a sustained period of time. Any number of individual phone lines (e.g., each with a unique NPA-NXX-XXXX formatted phone number) may access the PSTN though, and be accessed from the PSTN through, a PBX 210. A DoS detection and circumvention system 140 may be implemented within the PBX 210 to detect and circumvent DoS attacks by delaying phone calls into and/or out of the organization.

In some embodiments, a DoS detection and circumvention system 140 may be implemented as a component of (or in communication with) a switch 200. For example, a phone carrier may operate one or more switches 200. In order to prevent and circumvent DoS attacks (and/or other congestion-related conditions), the carrier may use a DoS detection and circumvention system 140 to delay phone calls into and/or out of particular switches, subnets, logical associations of switches (or other devices), geographic areas, etc. In some embodiments, a DoS detection and circumvention system 140 may be implemented separately from a switch 200 or PBX 210. For example, a phone carrier or other network operator may use a substantially "stand-alone" DoS detection and circumvention system 140 to delay phone calls into and/or out of particular geographic areas, switches, subnets, logical associations of switches or other devices, etc.

Example DoS Circumvention Routine

Figure 3:
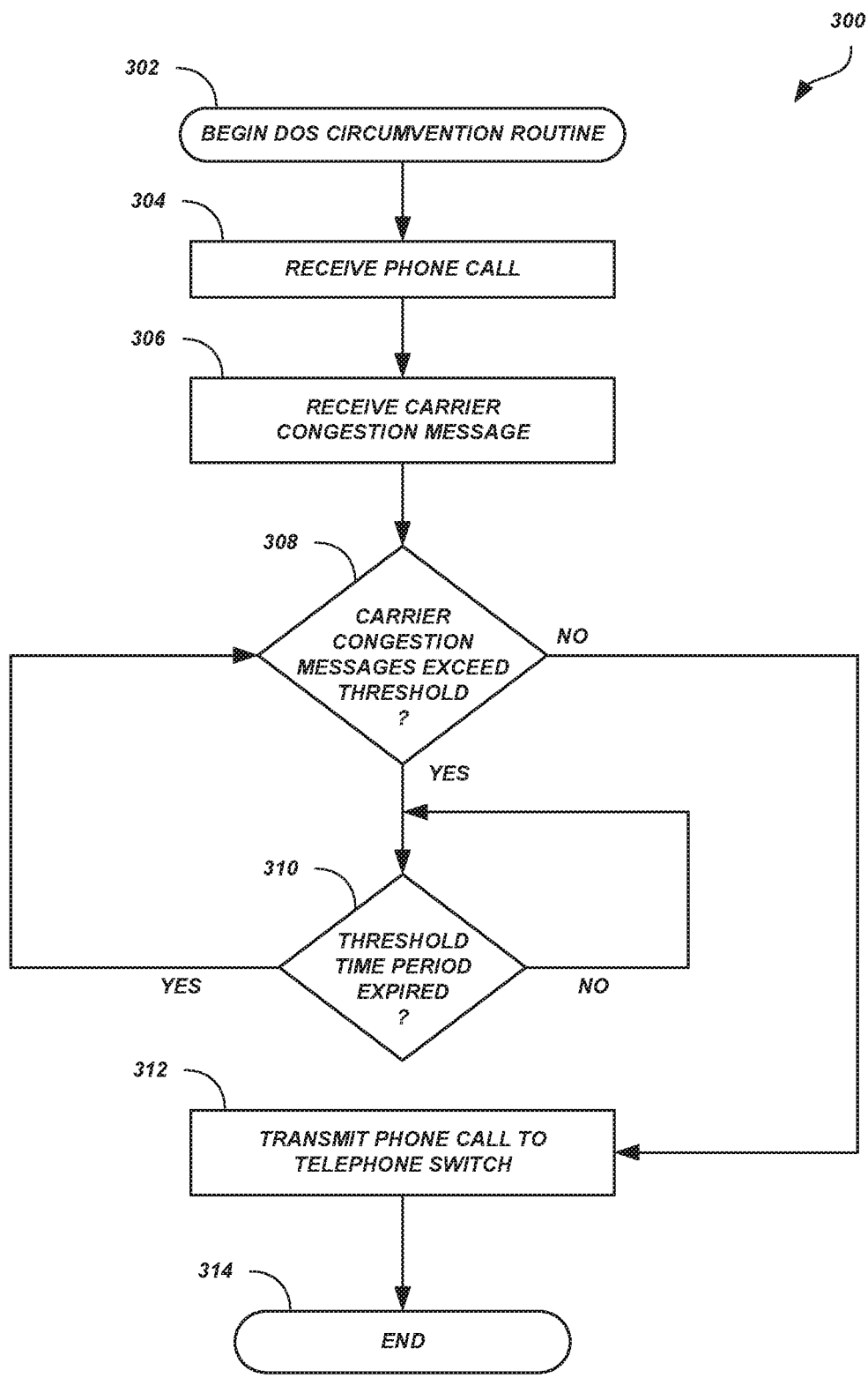
FIG. 3 is a flow diagram depicting an illustrative DoS circumvention routine according to some embodiments.

FIG. 3 is a flow diagram depicting a DoS circumvention routine 300 illustratively implemented by a DoS detection and circumvention system, according to one embodiment. As an example, the DoS detection and circumvention system 140 of FIG. 1 can be configured to execute the DoS circumvention routine 300.

The DoS circumvention routine 300 begins at block 302. When the routine 300 is initiated, a set of executable program instructions stored on one or more non-transitory computer-readable media (e.g., hard drive, flash memory, removable media, etc.) may be loaded into memory (e.g., random access memory or "RAM") of a computing device, such as the computing device 500 shown in FIG. 5 and described in greater detail below. In some embodiments, the routine 300 or portions thereof may be implemented on multiple processors of a single computing device 500 or multiple computing devices 500, serially or in parallel.

At block 304, a phone call is received. For example, a phone call may originate from an originating phone number to a destination phone number. The originating phone number and the destination phone number may have the same or different NPAs and/or NXXs. The phone call may be directed to an NPA and/or NXX that has received a high volume of phone calls within a short period of time, which could indicate that a DoS attack is occurring.

At block 306, a carrier congestion message is received corresponding to the NPA and/or NXX of the destination phone number. In some embodiments, as described above, the carrier congestion message may be received when the NPA and/or NXX is experiencing a high volume of calls. Illustratively, the DoS detection and circumvention system 140 (or a switch, PBX, or other telecommunications system of which the DoS detection and circumvention system 140 is a component) may attempt to connect the call from the originating phone number to the destination phone number. For example, the DoS detection and circumvention system 140 may attempt to connect the telephone call through the telephone switch corresponding to the LRN of the destination phone number. The DoS detection and circumvention system 140 may receive a congestion message in response to the attempt to connect the call. In some embodiments, the DoS detection and circumvention system 140 may not first attempt to connect the call from the originating phone number to the destination phone number, but may instead proceed from block 304 to decision block 308 without first executing block 306.

At decision block 308, a determination is made as to whether there is excessive congestion associated with the phone call. In some embodiments, excessive congestion refers to a state in which a number of carrier congestion messages associated with the call and received within a set period of time exceeds a congestion threshold. If the number of carrier congestion messages received within the set period of time exceeds the congestion threshold, then the DoS circumvention routine 300 proceeds to decision block 310. Otherwise, if the number of carrier congestion messages received within the set period of time does not exceed the congestion threshold, then the DoS circumvention routine 300 proceeds to block 312. In some embodiments, the congestion threshold may be a substantially static threshold, such as a system parameter that is set by a system administrator. In other embodiments, the congestion threshold may be a dynamic threshold. For example, the system may automatically change the congestion threshold according to environmental factors (e.g., time of day or other temporal factors, network capacity, etc.). As another example, different service providers, NPAs, NXX's, and/or combinations thereof may have different congestion thresholds. In some embodiments, the congestion threshold(s), whether dynamic or substantially static, may be determined based on an analysis of phone calls over a period of time.

Figure 4:
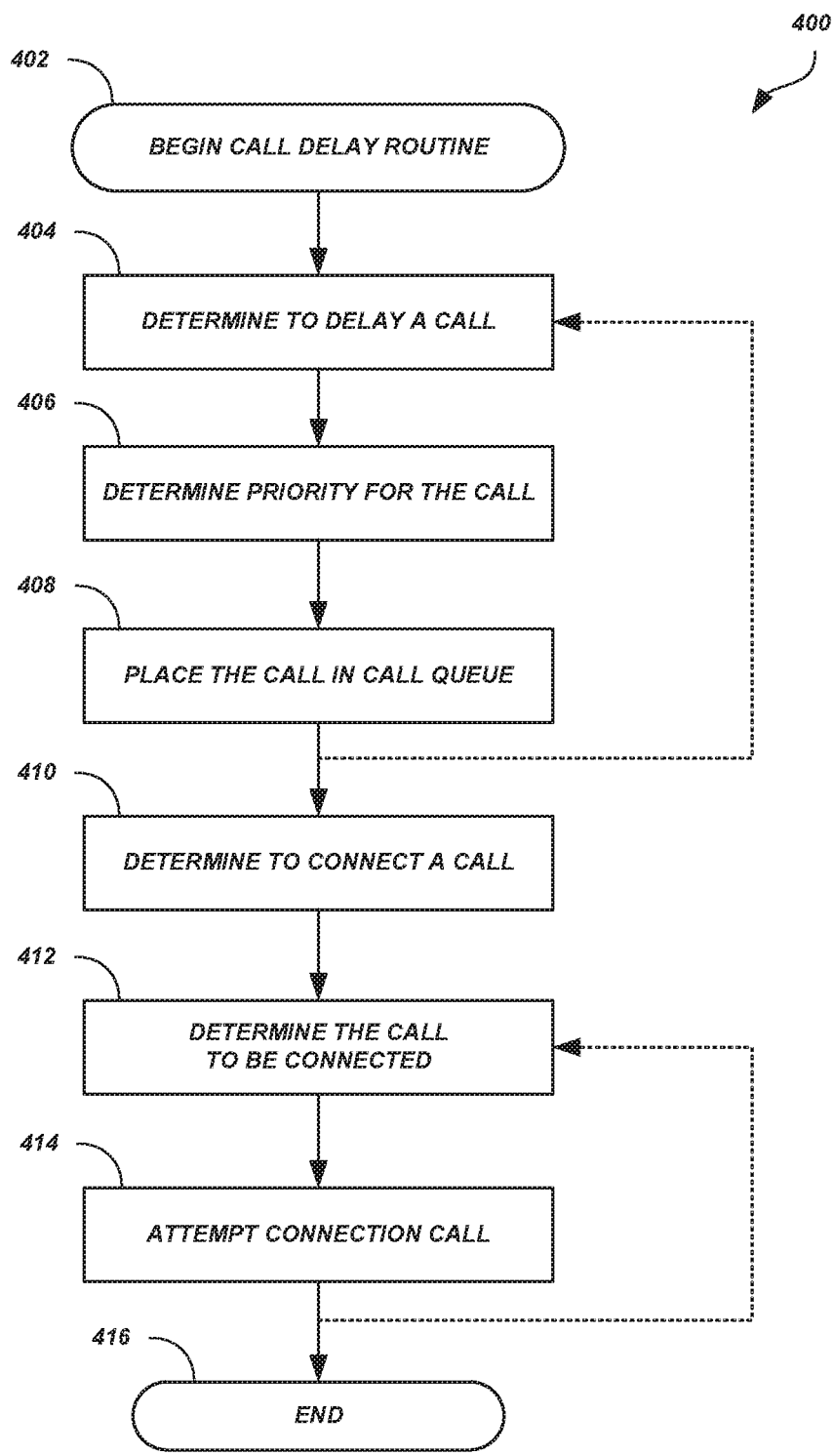
FIG. 4 is a flow diagram depicting an illustrative call delaying routine according to some embodiments.

At decision block 310, a determination is made as to whether a threshold time period has expired. For example, the threshold time period may begin when a determination is made that the number of carrier congestion messages received within the set period of time exceeds the congestion threshold and/or when the carrier congestion message that caused the number to exceed the congestion threshold is received. In such cases, the system may delay connection of the phone call until the threshold time period—which may have already begun—has expired. As another example, a separate threshold time period may be used for each phone call to be delayed, and the time period for any particular phone call may not begin until the phone call is received, the determination to delay the phone call is made, or some other "real-time" or in-line event. The length of the threshold time period may be the same or different for each call. An example routine for prioritizing the connection of delayed calls—and thus potentially differing the length of time that the calls are delayed—is shown in FIG. 4 and described in greater detail below.

If the threshold time period has expired, then the DoS circumvention routine 300 may return to decision block 308 to determine whether there is still an impermissible or otherwise non-desirable amount of congestion. Otherwise, if the threshold time period has not expired, then the DoS circumvention routine 300 may repeat decision block 310 (or otherwise wait until the threshold time period has expired), thereby preventing the phone call from being sent to the telephone switch corresponding to the LRN of the destination phone number.

Advantageously, by returning to decision block 308 after the threshold time period has expired, the system can avoid merely delaying a DoS attack. Instead, the system can delay individual calls that would be part of a DoS attack, and only proceed to transmit the calls to the corresponding telephone switch after the threshold time period for each call has expired and congestion is no longer an issue. Thus, if there are several calls being delayed simultaneously or in parallel (e.g., hundreds, thousands, or more, as may happen during a DoS attack), each individual call is delayed and then connected on an individual basis only if there is no longer an impermissible or undesirable level of congestion.

At block 312, the phone call is transmitted to the telephone switch corresponding to the LRN of the destination phone number. The phone call may be transmitted to the telephone switch because excessive congestion is not present and the threshold time period has expired. After the phone call is transmitted to the telephone switch, the DoS circumvention routine 300 is complete for this call, as shown at block 314.

Example Use Case

Table 1 below illustrates a timeline of originating and destination phone numbers over a period of time.

TABLE 1

| Time | From Number | To Number | Carrier Status |
|---|---|---|---|
| 0 | 949-221-XXXX | 213-321-XXXX | Accepted |
| 1 | 310-321-XXXX | 213-321-XXXX | Rejected (Congestion) |
| 2 | 424-321-XXXX | 213-321-XXXX | Rejected (Congestion) |
| 3 | 919-331-XXXX | 213-321-XXXX | CALL NOT SENT |
| 4 | 919-331-XXXX | 213-111-XXXX | Accepted |
| 5 | 919-331-XXXX | 213-222-XXXX | Accepted |
| 6 | 919-331-XXXX | 213-321-XXXX | Delayed call sent. Accepted |

As shown in Table 1, a first call to the 213-321 (NPA-NXX) is accepted. Calls to the 213-321 (NPA-NXX) start to be rejected by the communications network 160 at times 1 and 2 due to congestion. These rejections trigger the service provider to issue carrier congestion messages (e.g., at time 1 and at time 2). The number of carrier congestion messages may equal or exceed a threshold value (e.g., 2), which causes the phone call delayer 144 to prevent a call at time 3 to the same 213-321 (NPA-NXX) to be sent to the telephone switch corresponding to the LRN of the NPA and NXX.

The phone call delayer 144 may continue to prevent phone calls to the 213-321 (NPA-NXX) from being sent to the telephone switch for a threshold period of time (e.g., 3 time periods). However, the phone call delayer 144 may allow phone calls to other NPAs and/or NXXs, even if the phone calls originate from a phone number that was otherwise prevented from initiating a phone call with a 213-321-XXXX number. For example, a phone call originating from 919-331-XXXX to 213-321-XXXX is prevented from being sent to the telephone switch at time 3, but a phone call originating from 919-331-XXXX to another NPA-NXX (e.g., 213-111-XXXX) is sent to the telephone switch at time 4 even though the threshold period of time has not yet expired.

After the threshold period of time expires at time 6, the phone call originating from 919-331-XXXX at time 3 is now sent to the telephone switch. As described above, the phone call delayer 144 may queue the phone call initiated by 919-331-XXXX at time 3 so that the phone call can be sent to the telephone switch once the threshold period of time expires.

In some embodiments, the DoS detection and circumvention system 140 may transmit a phone call, with the same NPA and NXX as a delayed phone call, to a different telephone switch. For example, the system 140 may receive a second phone call during a period of time in which the delayed phone call is being delayed. The system 140 may determine that the destination phone number of the second phone call has a different LRN than the destination phone number of the delayed phone call, even though the destination phone number of second phone call has the same NPA and NXX as the destination phone number of delayed phone call. This determination may be made by, e.g., querying an LRN database or map that associates LRNs with phone numbers in cases where a phone number was ported to a different network, area, etc. The system 140 may determine that the LRN for second phone call corresponds to a second telephone switch that is different than the telephone switch to which the system 140 is delaying the transmission of the delayed call. The system 140 may therefore send the second phone call to the second telephone switch without introducing a delay, as was implemented for the delayed phone call.

In some embodiments, the DoS detection and circumvention system 140 may delay transmission of a phone call, with a different NPA and/or NXX than a delayed phone call, to the telephone switch associated with the delayed call. For example, the system 140 may receive a second phone call during a period of time in which the delayed phone call is being delayed. The system 140 may determine that the destination phone number of the second phone call has the same LRN as the destination phone number of the delayed phone call, even though the destination phone number of second phone call has a different NPA and/or NXX than the destination phone number of delayed phone call. This determination may be made by, e.g., querying an LRN database or map that associates LRNs with phone numbers in cases where a phone number was ported to a different network, area, etc. The system 140 may determine that the LRN for second phone call corresponds to the same telephone switch as the delayed call. The system 140 may therefore delay sending the second phone call to the telephone switch, as is done with the delayed phone call.

Example Call Delay Routine

FIG. 4 is a flow diagram depicting a phone call delay routine 400 illustratively implemented by a DoS detection and circumvention system, according to one embodiment. As an example, the DoS detection and circumvention system 140 of FIG. 1 can be configured to execute the DoS circumvention routine 400.

The phone call delay routine 400 begins at block 402. When the routine 400 is initiated, a set of executable program instructions stored on one or more non-transitory computer-readable media (e.g., hard drive, flash memory, removable media, etc.) may be loaded into memory (e.g., random access memory or "RAM") of a computing device, such as the computing device 500 shown in FIG. 5 and described in greater detail below. In some embodiments, the routine 400 or portions thereof may be implemented on multiple processors of a single computing device 500 or multiple computing devices 500, serially or in parallel.

At block 404, the phone call delayer 144 or some other component or subsystem of the DoS detection and circumvention system 140 can determine to delay a phone call. For example, the determination to delay a phone call may be made in response to determining, at decision block 308 of the routine 300, that the carrier congestion messages relevant to the phone call (e.g., those associated with the same LRN) exceed a congestion threshold.

At block 406, the phone call delayer 144 or some other component or subsystem of the DoS detection and circumvention system 140 can determine a priority for the phone call. The priority may be an absolute priority (e.g., a specific spot within a queue, such as first or last) or a relative priority with respect to other phone calls (e.g., calls prioritized as "moderate priority" are to be connected after calls prioritized as "high priority" but before calls prioritized as "low priority").

In some embodiments, the priority for a phone call may be a function of when the phone call was received. For example, phone calls may be queued in the order in which they are received, and then connection attempts may be made in the same order. This prioritization may be preferred to as first-in-first-out (FIFO) queuing.

In some embodiments, the priority for a phone call may be based on the originating phone number and/or the destination phone number. For example, particular originating and/or destination phone numbers (or groups thereof, such as phone numbers associated with particular NPAs and/or NXXs) may be associated with different levels of priority in a multi-level prioritization hierarchy. As calls are delayed, they may be tagged or queued based on their relative levels of priority with respect to each other such that higher-priority calls are connected before lower-priority calls, even if the lower-priority calls were received first.

In some embodiments, phone numbers may be analyzed against a database of recently received phone calls, such as phone calls received within a predetermined or dynamically determined window of time. Calls may then be prioritized based at least in part on the quantity of such calls associated with particular originating and/or destination phone numbers (or groups thereof, such as phone numbers associated with particular NPAs and/or NXXs). For example, if a threshold number of calls to or from particular NPAs and/or NXXs are delayed within a particular window of time, then such calls may be prioritized lower—and therefore delayed longer—than other phone calls. In this way, the DoS detection and circumvention system 140 may further reduce the chances of a DoS attack (or associated condition) by delaying "problem" phone numbers while allowing other phone calls to be connected.

The example prioritization methods described herein are illustrative only, and are not intended to be limiting. In some embodiments, additional and/or alternative prioritization methods may be used, or multiple methods may be used in combination.

At block 408, the phone call delayer 144 or some other component or subsystem of the DoS detection and circumvention system 140 can place the phone call in a queue or other data structure to be held until the call is to be connected.

At block 410, the phone call delayer 144 or some other component or subsystem of the DoS detection and circumvention system 140 can determine to connect a call in the queue (or other data structure). For example, the determination to connect a call may be made after determining, in decision block 308 of routine 300, that the carrier congestion messages do not exceed the threshold.

At block 412, the phone call delayer or some other component or subsystem of the DoS detection and circumvention system 140 can select the call to be connected. If a queue data structure is used to maintain the phone calls, then the first call in the queue may be selected. Depending upon the prioritization method, other criteria may be used to select the call. For example, individual calls may be scored based on the priority of the calls, amount of time the calls have been delayed, other criteria, some combination thereof, etc. A call may then be selected based on an analysis of the score with respect to scores of other delayed calls.

At block 414, the phone call delayer or some other component or subsystem of the DoS detection and circumvention system 140 can attempt reconnection of the selected call. The routine 400 may return to block 412 as needed (e.g., as long as there are delayed calls remaining to be connected). At block 416, the routine terminates.

Additional Embodiments

The example components and data stores of the DoS detection and circumvention system 140 shown in FIG. 1 are illustrative only, and are not intended to be limiting. In some embodiments, a DoS detection and circumvention system 140 may have fewer, additional, and/or alternative components and data stores.

The DoS detection and circumvention system 140 may be implemented on one or more physical server computing devices that provide computing services and resources to user devices 102, 104. In some embodiments, the DoS detection and circumvention system 140 (or individual components thereof, such as the LRN detector 142, congestion detector 143, phone call delayer 144, dialed phone call data store 145, carrier congestion data store 146, etc.) may be implemented on one or more host devices, such as blade servers, midrange computing devices, mainframe computers, desktop computers, or any other computing device configured to provide computing services and resources. For example, a single host device may execute one or more LRN detectors 142, congestion detectors 143, phone call delayers 144, dialed phone call data stores 145, carrier congestion data stores 146, some combination thereof, etc. The DoS detection and circumvention system 140 may include any number of such hosts.

In some embodiments, the features and services provided by the DoS detection and circumvention system 140 may be implemented as web services consumable via one or more communication networks. In further embodiments, the DoS detection and circumvention system 140 (or individual components thereof) is provided by one more virtual machines implemented in a hosted computing environment. The hosted computing environment may include one or more rapidly provisioned and released computing resources, such as computing devices, networking devices, and/or storage devices. A hosted computing environment may also be referred to as a "cloud" computing environment.

The individual user devices 102, 104 may be any of a wide variety of electronic communication devices, including personal computing devices, terminal computing devices, laptop computing devices, tablet computing devices, electronic reader devices, wearable computing devices, mobile devices (e.g., cellular and other mobile phones, smart phones, media players, handheld gaming devices, etc.), and various other electronic devices and appliances. Although the user devices 102 and user devices 104 are referred to separately herein, in some embodiments the user devices 102 and 104 may be the same type of device or may provide some or all of the same functionality as each other.

Example Computing Device

Figure 5:
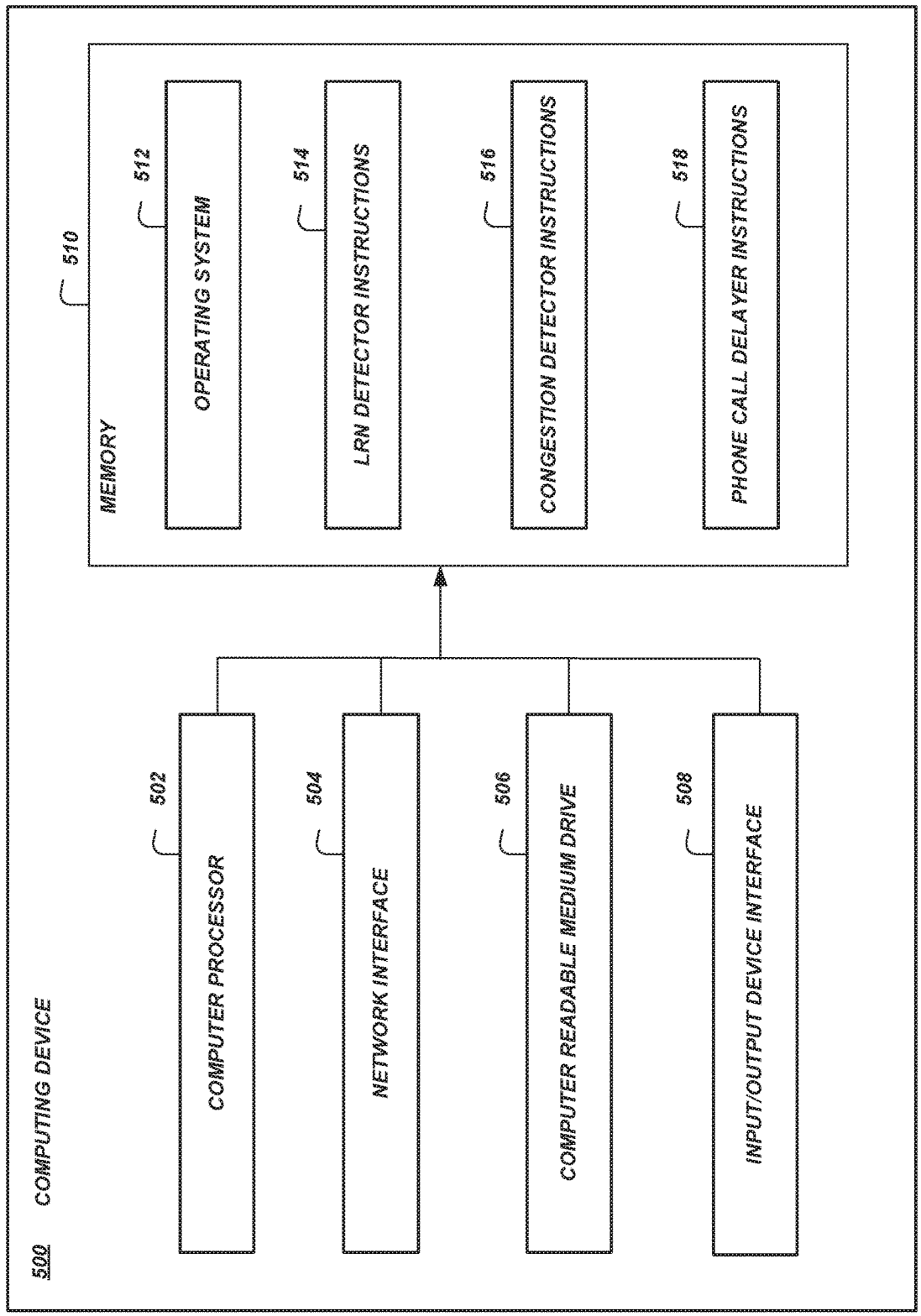
FIG. 5 is a block diagram illustrating components of a computing device configured to execute processes for denial of service detection and circumvention according to some embodiments.

FIG. 5 illustrates the various components of an example computing device 500 configured to implement some or all of the functionality of the DoS detection and circumvention system 140. In some embodiments, as shown, the computing device 500 may include: one or more computer processors 502, such as physical central processing units ("CPUs"); one or more network interfaces 504, such as a network interface cards ("NICs"); one or more computer readable medium drives 506, such as a high density disks ("HDDs"), solid state drives ("SDDs"), flash drives, and/or other persistent non-transitory computer-readable media; an input/output device interface 508, such as an IO interface in communication with one or more microphones; and one or more computer readable memories 510, such as random access memory ("RAM") and/or other volatile non-transitory computer-readable media.

The computer readable memory 510 may include computer program instructions that one or more computer processors 502 execute in order to implement one or more embodiments. The computer readable memory 510 can store an operating system 512 that provides computer program instructions for use by the computer processor(s) 502 in the general administration and operation of the computing device 500. In some embodiments, the computer readable memory 510 can further include computer program instructions and other information for implementing aspects of the present disclosure. For example, in one embodiment, the computer-readable memory 510 may include LRN detector instructions 514 for implementing features of the LRN detector 142, congestion detector instructions 516 for implementing features of the congestion detector 143, and/or phone call delayer instructions 518 for implementing features of the phone call delayer 144.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising computer-readable storage and one or more computer processors in communication with the computer-readable storage, wherein the system is configured to at least:
   receive, via a phone network, a first phone call directed to a first destination phone number, wherein the first destination phone number is associated with a first telephone switch of a plurality of telephone switches;
   receive a carrier congestion message in response to attempting to connect the first phone call to the first telephone switch;
   determine a first threshold value based at least partly on an association of the first threshold value with the first telephone switch, wherein a second telephone switch of the plurality of telephone switches is associated with a second threshold value different than the first threshold value;
   determine that a number of carrier congestion messages, associated with the first telephone switch and received within a first time period, exceeds the first threshold value;
   determine to delay a second attempt to connect the first phone call to the first telephone switch;
   receive, via the phone network, a second phone call directed to a second destination phone number associated with the first telephone switch, wherein the second phone call is received during a second time period beginning after the carrier congestion message is received;
   determine, based at least partly on the second phone call being received during the second time period, to delay an initial attempt to connect the second phone call to the first telephone switch;
   receive, via the phone network during the second time period, a third phone call directed to a third destination phone number, wherein the third destination phone number is associated with the second telephone switch;
   determine, based at least partly on the third phone call being associated with the second telephone switch, to attempt to connect the third phone call to the second telephone switch without first delaying connection of the third phone call;
   determine that the second time period has expired; and
   connect the first phone call and the second phone call to the first telephone switch.

2. The system of claim 1, wherein the determination to delay the second attempt to connect the first phone call to the first telephone switch is based at least partly on the number of carrier congestion messages, associated with the first telephone switch and received within the first time period, exceeding the first threshold value.

3. The system of claim 1, wherein the first destination phone number is different than the second destination phone number.

4. The system of claim 1, further configured to:
   determine a location routing number ("LRN") associated with the first destination phone number; and
   determine to attempt to connect the first phone call to the first telephone switch based at least partly on the first telephone switch being associated with the LRN.

5. The system of claim 4, wherein the LRN is determined based at least partly on a numbering plan area code and a central office exchange code of the first destination phone number.

6. The system of claim 1, further configured to:
place the first phone call in a phone call queue based at least partly on the determination to delay the second attempt to connect the first phone call to the first phone call switch; and
place the second phone call in the phone call queue based at least partly on the determination to delay the initial attempt to connect the second phone call to the first telephone switch.

7. The system of claim 1, further configured to:
place data representing the first phone call in a phone call delay data structure based at least partly on the determination to delay the second attempt to connect the first phone call to the first phone call switch; and
place data representing the second phone call in the phone call delay data structure based at least partly on the determination to delay the initial attempt to connect the second phone call to the first telephone switch.

8. The system of claim 1, further configured to:
determine a prioritization level for the first phone call based on at least one of: an originating phone number associated with the first phone call, or the first destination phone number; and
determine to connect the first phone call to the first telephone switch before connecting the second phone call to the first telephone switch based at least partly on the prioritization level.

9. A computer-implemented method comprising:
as implemented by a computing system comprising one or more computer processors configured to execute specific instructions,
receiving, via a phone network, a first phone call directed to a first destination phone number, wherein the first destination phone number is associated with a first telephone switch of a plurality of telephone switches;
receiving a carrier congestion message in response to an attempt to connect the first phone call to the first telephone switch;
determining a first threshold value based at least partly on an association of the first threshold value with the first telephone switch, wherein a second telephone switch of the plurality of telephone switches is associated with a second threshold value different than the first threshold value;
determining that a number of carrier congestion messages, associated with the first telephone switch and received within a first time period, exceeds the first threshold value;
delaying a subsequent attempt to connect the first phone call to the first telephone switch;
receiving, via the phone network, a second phone call directed to a second destination phone number associated with the first telephone switch, wherein the second phone call is received during a second time period beginning after the carrier congestion message is received;
delaying connection of the second phone call without first attempting to connect the second phone call to the first telephone switch;
receiving, via the phone network during the second time period, a third phone call directed to a third destination phone number, wherein the third destination phone number is associated with the second telephone switch;
determining, based at least partly on the third phone call being associated with the second telephone switch, to attempt to connect the third phone call to the second telephone switch without first delaying connection of the third phone call;
determining that the second time period has expired; and
connecting the first phone call and the second phone call to the first telephone switch.

10. The computer-implemented method of claim 9, further comprising determining to delay the subsequent attempt to connect the first phone call to the first telephone switch based at least partly on the number of carrier congestion messages, associated with the first telephone switch and received within the first time period, exceeding the first threshold value.

11. The computer-implemented method of claim 9, further comprising determining, based at least partly on receiving the second phone call during the first time period, to delay connection of the second phone call to the first telephone switch without first attempting to connect the second phone call to the first telephone switch.

12. The computer-implemented method of claim 9, further comprising:
determining a location routing number ("LRN") associated with the first destination phone number; and
determining to attempt to connect the first phone call to the first telephone switch based at least partly on the first telephone switch being associated with the LRN.

13. The computer-implemented method of claim 12, wherein determining the LRN is based at least partly on a numbering plan area code and a central office exchange code of the first destination phone number.

14. The computer-implemented method of claim 9, wherein delaying the subsequent attempt to connect the first phone call comprises placing the first phone call in a phone queue, and wherein delaying connection of the second phone call comprises placing the second phone call in the phone queue.

15. The computer-implemented method of claim 9, wherein delaying the subsequent attempt to connect the first phone call comprises placing data representing the first phone call in a phone call delay data structure, and wherein delaying connection of the second phone call comprises placing data representing the second phone call in the phone call delay data structure.

16. The computer-implemented method of claim 9, further comprising:
determining a prioritization level for the first phone call based on at least one of: an originating phone number associated with the first phone call, or the first destination phone number; and
determining to connect the first phone call to the first telephone switch before connecting the second phone call to the first telephone switch based at least partly on the prioritization level.

* * * * *